United States Patent [19]

Willis et al.

[11] Patent Number: 4,458,323
[45] Date of Patent: Jul. 3, 1984

[54] METHOD OF PERFORMING MEASUREMENTS AND ERROR ANALYSIS OF THE MEASUREMENTS

[75] Inventors: Barry G. Willis, Los Altos Hills; Arthur Schleifer; Norton W. Bell, both of Palo Alto, all of Calif.; Paul C. Dryden, West Chester, Pa.; Andrew Stefanski, Menlo Park, Calif.; C. Nelson Dorny, Broomall, Pa.

[73] Assignee: Hewlett-Packard Company, Palo Alto, Calif.

[21] Appl. No.: 362,217

[22] Filed: Mar. 26, 1982

Related U.S. Application Data

[62] Division of Ser. No. 141,491, Apr. 18, 1980, Pat. No. 4,357,673.

[51] Int. Cl.$^3$ .......................... G01J 3/42; G06F 15/20
[52] U.S. Cl. .................................... 364/582; 364/554; 364/575; 356/323
[58] Field of Search ............... 364/570, 571, 579, 582, 364/554, 552, 575, 498; 356/319, 323, 325, 326

[56] References Cited

U.S. PATENT DOCUMENTS

| | | | |
|---|---|---|---|
| 3,751,643 | 8/1973 | Dill et al. ............. | 364/582 |
| 3,874,799 | 4/1975 | Isaacs et al. ............. | 356/323 |
| 4,043,756 | 8/1977 | Sommervold ............. | 364/571 |
| 4,093,991 | 6/1978 | Christie, Jr. et al. ............. | 364/498 |
| 4,158,505 | 6/1979 | Mathisen et al. ............. | 356/325 |
| 4,180,327 | 12/1979 | Maeda et al. ............. | 356/325 |
| 4,200,934 | 4/1980 | Hofmann ............. | 364/571 |
| 4,227,079 | 10/1980 | Dukes et al. ............. | 356/326 |
| 4,228,515 | 10/1980 | Genna et al. ............. | 364/571 |

Primary Examiner—Gary Chin
Attorney, Agent, or Firm—John A. Frazzini

[57] ABSTRACT

An instrument is disclosed which performs measurements and calculates the average and the variance of the measurements. The particular instrument illustrating the invention is a spectrophotometer which measures sets of dark, reference and sample spectra for use in calculating an average absorbance spectrum and its variance. The measurements are performed in an order which enables the cancellation of measurement variation due to variation in instrument response. The order of measurements is determined by measurement subroutines which can be aggregated to produce a series of measurements performed over a user selected period of integration time.

15 Claims, 9 Drawing Figures

METHOD OF PERFORMING MEASUREMENTS AND ERROR ANALYSIS OF THE MEASUREMENTS

CROSS REFERENCE TO RELATED APPLICATION

This is a division of application Ser. No. 141,491, filed Apr. 18, 1980, now U.S. Pat. No. 4,357,673.

BACKGROUND OF THE INVENTION

This invention relates in general to measuring instruments and in particular to measuring instruments capable of performing error analysis of the results of measurements. All measurements contain errors from sources such as background effects. These effects are typically eliminated by performing a background measurement in which no sample is present and subtracting the background result from the results of all subsequent measurements. Instrument response can also vary so that typically the results of sample measurements are normalized against the results of a reference measurement in which a reference substance is measured. In general, the normalized results is some funtion of the ratio between the background corrected sample result and the background corrected reference result. For example, in analysis on a spectrophotometer the normalized result is the transmittance T and is calculated from the result S of a sample measurement, the result R of a reference measurement, and the result D of a background measurement by the relation $T = (S - D)/(R - D)$.

Normalized results such as T still contain errors due to a variety of sources. For example, in a spectrophotometer the sample and reference can vary chemically or physically, the optical source can vary in intensity, and the optical detector can vary in sensitivity. If these parameters vary significantly on a time scale which is less than the total measurement time, then these effects will produce errors in the normalized result. In addition, the sample being tested or the measurement process employed can have inherent statistical fluctuations which produce measurement error. For example, in radioactive decay processes, the number of decays per second contains an inherent fluctuation. In measurements with a spectrophotometer, the photodetectors have an inherent variation because photons striking the detector have a probability less than one of being detected and because shot noise produces variations.

In order to judge the validity of the normalized result it is necessary to know the variance of the result. In general the variance is determined by performing a series of measurements and applying well known equations to calculate the average and variance of the results of the measurements. This error analysis process has even been automated on a number of devices including several brands of pocket calculators.

So if measuring instruments are well known and automated error analysis is well known, what's special about combining measurement and error analysis in one instrument? There are actually a number of benefits to combining both capabilities in a single instrument if the combination is achieved in the right manner. If the calculation process is not merged with the measurement process then an inordinately large memory would be required to hold the data from which the average and variance are calculated. In a practical sense, the amount of data is too large for separate acquisition and statistical data manipulation to be usable. This problem is especially acute in instruments, such as a spectrophotometer, which produce spectral data. Each spectral measurement actually consists of data at a large set of points. For example, if a spectrophotometer measures absorbance at 400 different wavelengths and only ten measurements are performed for each of S, R, and D, then 12,000 pieces of data must be stored for error analysis.

In order to merge the calculation process with the measurement process, the calculation process must be at least as fast as the measurement process. But to keep instrument cost down and to improve instrument speed, the central processing unit (CPU) which performs the error calculations should be available in any period in which calculations are not being performed to direct instrument control or perform non-error analysis calculations. The CPU should also control the ordering of sample, reference, an dark measurements to minimize or eliminate effects due to instrument response variation. The measurement and analysis processes also should be merged in a way which allows selection of a range of measurement integration times to enable the user to select a long enough time to reduce the variance to an acceptable level.

SUMMARY OF THE INVENTION

An instrument is presented which performs a series of sample, reference, and dark (i.e. background) measurements to generate a normalized result. The results of the sample measurements are automatically processed to generate the average $\bar{S}$ and variance VS of the sample measurements. Likewise the average $\bar{R}$ and variance VR of the reference measurements and the average $\bar{D}$ and variance VD of the dark measurements are generated. These results are then used to calculate the average and varience of the normalized measurement result.

The calculations and measurement control are performed by a central processing unit (CPU). The measuring section of the instrument and the CPU are interfaced in a structure which enables various goals to be achieved. The primary routine of the CPU has 2 modes: the calculation mode in which the CPU performs various calculations including error analysis; and the standby mode in which the CPU is waiting for a calculation request. This primary routine is periodically interrupted to see if a measurement is to be performed. If no measurement is to be performed or if the measurement is completed then the CPU returns to performance of the primary routine. This scheme of interrupted routine execution allows efficient use of the CPU and avoids the delay which would be required if the calculations had to be completed before another measurement could be performed. This elimination of such delays allows reduction of the time between measurements thereby reducing the amount of variation of instrument response between measurements.

The sample, reference, and dark measurements are also controlled in a way which eliminates the effect of instrument response variation from the calculated normalized result and also allows the user to select a measurement routine which is long enough to reduce the variance of the normalized result to an acceptable level. These objectives are achieved by employing a set of subroutines which are selected in response to user commands and which perform sample, reference, and dark measurements throughout the measurement interval.

DESCRIPTION OF THE PREFERRED EMBODIMENT

In accordance with the illustrated preferred embodiment, a spectrophotometer is presented which performs measurement routines in which a series of sample, reference, and dark measurements are performed. The average $\bar{S}$ and variance VS of the sample measurements, the average $\bar{R}$ and variance VR of the reference measurements, and the average $\bar{D}$ and variance VD of the dark measurements are separately calculated for use in calculating the average $\bar{A}$ and variance VA of the absorbance of the sample substance. The absorbance and its variance are calculated in a central processing unit (CPU) using the equations:

$$\bar{A} = -\log[(\bar{S}-\bar{D})/(\bar{R}-\bar{D})]$$

$$VA = [(\bar{R}-\bar{D})^2 VS + (\bar{S}-\bar{D})^2 VR + (\bar{R}-\bar{S})^2 VD]/(\bar{R}-\bar{D})^2(\bar{S}-\bar{D})^2$$

These calculations are performed at each wavelength in the spectral range of the spectrophotometer to generate an absorbance spectrum and its variance. The spectrophotometer can also include the capability of generating a balance spectrum B and its variance VB by use of the above equations for $\bar{A}$ and VA to correct for mismatch between sample and reference cells. This procedure is disclosed in U.S. application Ser. No. 112,966 entitled Multibeam Spectrophotometer For Producing Balanced Spectra filed by Barry G. Willis et al on Jan. 15, 1980. In such a spectrophotometer the balanced spectra $\bar{A}_B$ and $VA_B$ are calculated as $\bar{A}_B = \bar{A} - B$ and $VA_B = VA + VB$.

This method for calculating the average and variance of a series of measurements has application to measuring instruments other than spectrophotometers and a spectrophotometer is presented only as a concrete example of the invention. In general, in any type of measurement, background effects are eliminated by performing a measurement with no sample present and subtracting the result from subsequent measurements in which a sample or reference substance is present. A normalized result is then calculated from the background corrected sample and reference measurements. The average and variance of the normalized result for a set of measurements can be calculated from the average and variance of sample, reference, and background measurements. In a spectrophotometer, the background measurement is referred to as the dark measurement and the normalized result is called the transmittance T. The transmittance is related to the absorbance by the relation $A = -\log T$.

ELIMINATION OF INSTRUMENT RESPONSE VARIATION

Measurements can vary in time not only because of inherent statistical variation of a series of measurements and variation in background effects but also because of variation of instrument response. The disclosed invention presents an instrument which calculates the average and variance of the results of a series of measurements in a way which eliminates the effects of variation in the instrument response. In a spectrophotometer this instrument response variation arises from several factors including variations in optical source intensity, detector sensitivity, and detector signal amplification. These three factors appear as a multiplicative factor in the result of a measurement, so that the result S of a sample measurement can be written as $S = \alpha_s s$ wherein $\alpha_s$ is the instrument response factor and s is the factor representing actual sample transmittance. Similarly the result R of a reference measurement can be written as $R = \alpha_r r$ and the result D of a dark measurement can be written as $D = \alpha_d d$. The subscripts s, r, and d on these variables indicates that these measurements are performed at 3 distinct times.

The instrument response factor will cancel out of the calculations of absorbance only if the sample reference and dark measurements are completed in an interval which is short compared to the characteristic time $t_I$ of variation of the instrument response factor so that $\alpha_s = \alpha_r = \alpha_d$.

Accuracy is therefore improved in a spectrophotometer capable of performing all sample, reference, and dark measurements in an interval which is short compared to $t_I$. However, the reduction of variance to desired levels often requires a total number of measurements extending over an interval which is longer than $t_I$ so that it is important to perform the series of measurements in a way which continues to allow cancellation of the instrument response factor. This cancellation is achieved by performing individual measurements in an interval which is short compared to $t_I$ and also performing sample, reference, and dark measurements throughout the entire measurement interval. To see that this procedure leads to cancellation of the instrument response function note that the variation of $\alpha_s$ and the variation of s are statistically independent so that the average of S equals the product of the average of $\alpha_s$ times the average of s (i.e. $\bar{S} = \bar{\alpha}_s \bar{s}$). Similarly, $\bar{R} = \bar{\alpha}_r \bar{r}$ and $\bar{D} = \bar{\alpha}_d \bar{d}$. Because all three types of measurements are performed throughout the measurement interval, the average values $\bar{\alpha}_s$, $\bar{\alpha}_r$, and $\bar{\alpha}_d$ of the instrument response factors are equal and cancel out of the calculations of $\bar{A}$ and VA.

Figure 1:
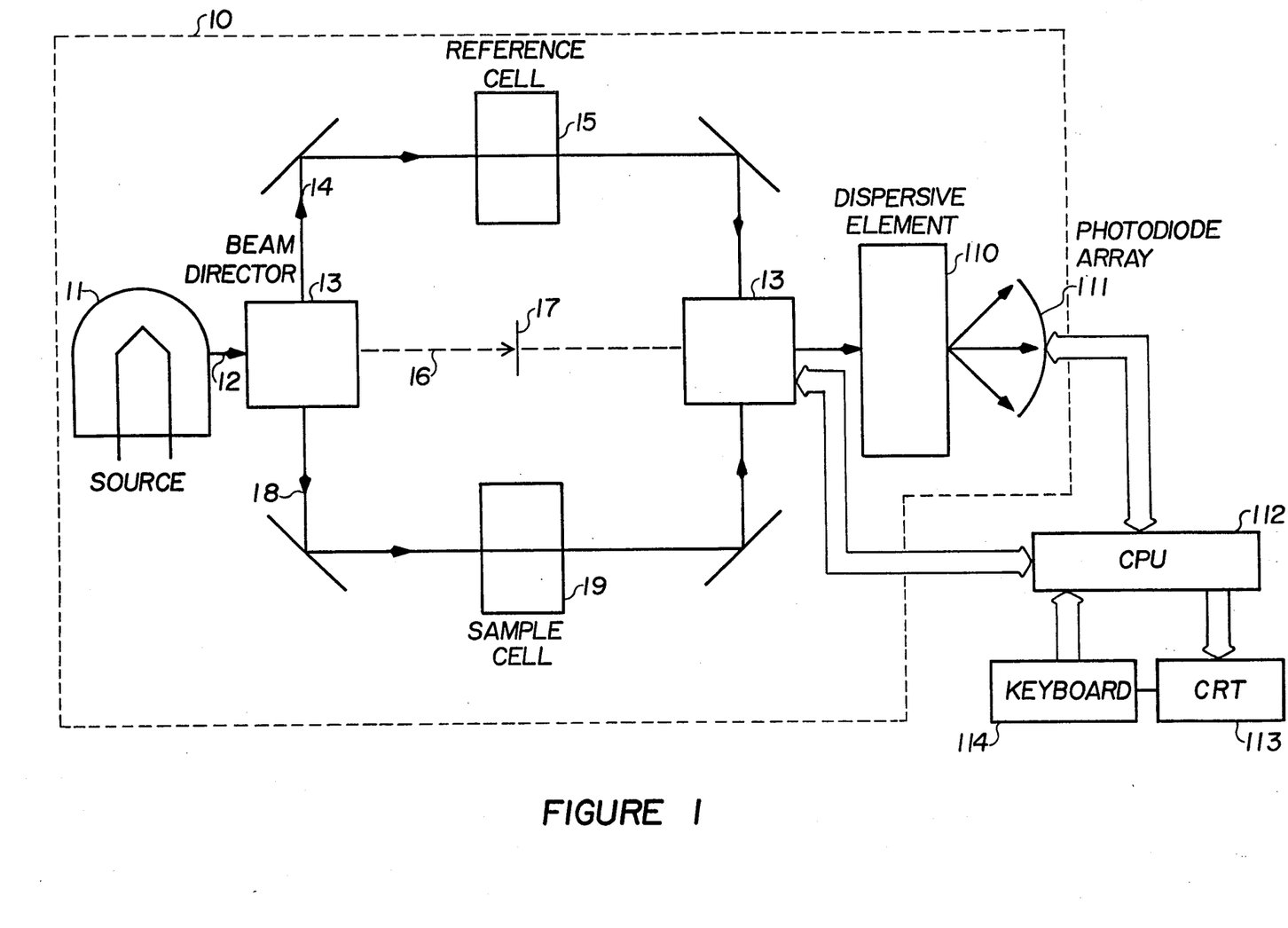
FIG. 1 is a schematic representation of a measurement section suitable for use in a spectrophotometer built in accordance with the disclosed invention.

An optical measurement section 10 having sample, reference, and dark positions such as the optical section presented in U.S. Pat. No. 4,227,079 entitled Multipath Fine Positioning Beam Director issued to Dukes et al on Oct. 7, 1980, is employed in a spectrophotometer built in accordance with the disclosed invention to enable sample, reference, and dark measurements to be performed in any selected order of performance. Measurement section 10 is illustrated schematically in FIG. 1. An optical beam 12 is produced by a source 11 and is directed by a beam director 13 along one of the following paths: a reference path 14 through a reference cell 15; a dark path 16 to a dark position 17; or a sample path 18 through a sample cell 19. The beam then strikes a dispersive element 110 and is dispersed to a photodiode detector array 111. The measurement results are transferred to a central processing unit (CPU) 112 for analysis and processing. An output section such as cathode ray tube (CRT) 113 is included to display the results processed by the CPU. An input section such as keyboard 114 is included to enable input of user commands (1) for selecting the measurement routine to be performed, (2) for initiating the execution of the measurement routine, (3) for initiating the output of data, and (4) for entering data.

Another type of optical measurement section is shown in U.S. Pat. No. 3,751,643 entitled "System For Performing Spectral Analyses Under Computer Control" issued to Dill et al on Aug. 7, 1973. In that type of optical measurement section a rotating chopper wheel alternately directs the light through a sample cell and through a reference cell. In such a device, the sample and reference measurements inherently are performed alternately so that the sequence of measurements exhibits a periodic pattern of sets of measurements, each set containing a sample and a reference measurement. In a device of that type further performing dark measurements, the sequence of measurements would again exhibit a periodic pattern, each period containing a sample measurement, a reference measurement and a dark measurement. In such a device, sample measurements and reference measurements (plus dark measurements in some devices) are inherently performed throughout the test interval in a periodic repetition of the same set of measurements. However, in a measuring apparatus such as that presented in U.S. Pat. No. 4,227,079, each of the three types of measurements are not inherently performed as every third measurement, but instead are performed aperiodically so that the sequence of measurements is not necessarily just a repetition of the same set of three measurements. In such an apparatus and aperiodic method of performing measurements, the measurement routine must be intentionally selected to perform all three types of measurements throughout the test interval. In a sequence of measurements, the three types of measurements will be referred to herein as "aperiodically interspersed throughout the sequence of measurements" when each of the three types of measurements is not performed repetitively as every third measurement, but instead is performed in an aperiodic sequence of measurements in which the time average of the multiplicative factors are essentially equal for all three types of measurements.

DATA ANALYSIS AND PROCESSING

Figure 2:
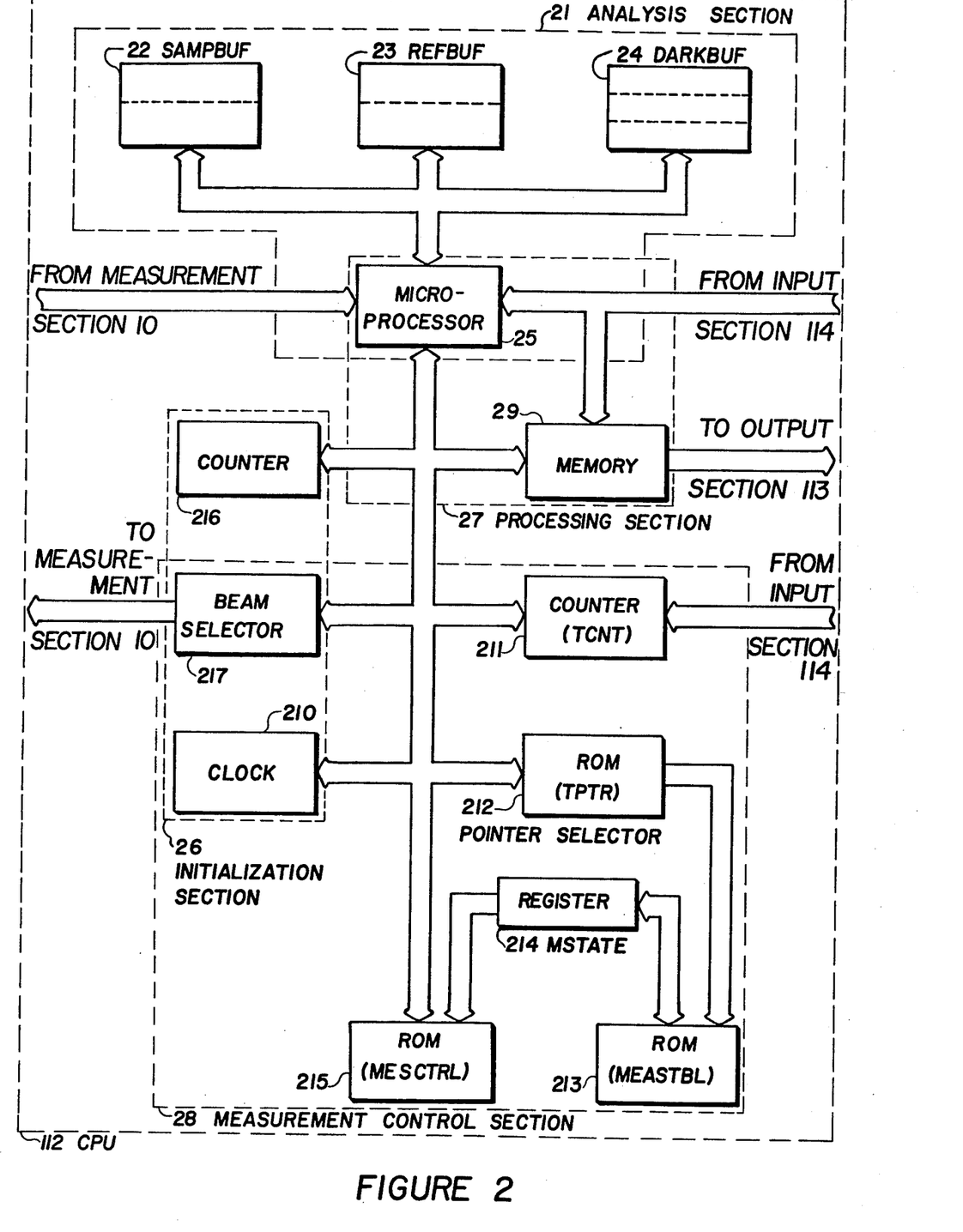
FIG. 2 shows a block diagram of a central processing unit which implements the disclosed invention.

The central processing unit 112 controls the beam director in accordance with a measurement routine to perform sample, reference, and dark measurements throughout the entire measurement interval and in accordance with an idle mode or a calculation mode, controls instrument operation in the interval between measurements. In any measurement routine, at least three measurements are performed on the sample and the results are transferred to an analysis section of the CPU for calculation of the average and variance. As shown in FIG. 2 the analysis section 21 includes a buffer 22 called SAMPBUF in which the results of the sample measurements are stored. In the first sample measurement, a microprocessor 25 such as the MC5 Manufactured by Hewlett-Packard Company or the Motorola 63000 stores the result $S_1$ for each photodiode in a first region of SAMPBUF. In subsequent sample measurements in the same measurement routine, only the difference between the result S and the first result $S_1$ is used for each photodiode. The difference $S-S_1$ and the square of the difference $(S-S_1)^2$ are calculated by microprocessor 25 and are added respectively to the sum $\Sigma_1$ of the differences and the sum $\Sigma_2$ of the square of the differences of the prior measurements in that measure operation. $\Sigma_1$ and $\Sigma_2$ for each photodiode are stored in a second region of SAMPBUF. After the last sample measurement in the measurement routine is performed, a flag called SAMPFLG is set to indicate to CPU 112 that the average value $\bar{S}$ and the variance VS are to be calculated as $$\bar{S}=S_1+(\Sigma_1/M)$$

$$VS=(\Sigma_2-(\Sigma_1/M))/(M^2-M)$$

where M is the number of sample measurements performed in the measurement routine. The CPU periodically checks SAMPFLG to see if it is time for such calculations. SAMPFLG is cleared when these calculations are completed.

In each sample measurement, SAMPFLG is checked and if it is still set then the analysis section 21 has not yet completed the sample calculations for the prior measurement routine. If SAMPFLG is still set then the data stored in SAMPBUF represents data from more than one measurement routine and therefore the measurement is aborted and a flag called MEASERR is set to indicate the presence of a measurement error and to initiate a spectrophotometer response (e.g. displaying "MEASUREMENT ERROR" on CRT 113) signalling the instrument user of such error. The same series of steps are also employed to calculate the reference spectrum and its variance, but a buffer 23 called REFBUF and a flag called REFFLAG are employed in place of SAMPBUF and SAMPFLG respectively.

The dark spectrum and its variance are calculated in a manner similar to that employed in calculating the sample spectrum and its variance using a buffer 24 called DARKBUF and a flag called DARKFLG in place of SAMPBUF and SAMPFLG respectively. The routine for calculating $\bar{D}$ differs from the routine for calculating $\bar{S}$ in that the set of dark measurements performed during a measurement routine is supplemented by a set of dark measurements performed prior to the execution of the measurement routine. The purpose of this supplemental set of dark measurements is to reduce the variance of the dark measurements below the variance of the sample and reference measurements. The variance of the absorbance spectrum is therefore determined primarily by the variance of the sample and reference measurements thereby reducing the variance of the absorbance spectrum. The dark spectrum often varies much more slowly than the sample or reference spectra so that this technique enables the reduction of VD even when the chemical dynamics of a sample or reference substance prevent the use of an extended measurement integration time to reduces VS and VR.

Buffer 24 includes a pushdown stack of registers capable of holding P dark spectra (in this embodiment P is selected equal to 10). At instrument turn-on an initialization section 26 initiates the performance of P dark spectra which are stored in the pushdown stack. Each subsequently measured dark spectrum is added to the stack replacing the earliest entered dark spectrum present in the stack so that the stack always contains the P most recently measured dark spectra. During the idle mode between the execution of measurement routines, the dark spectrum is periodically measured to update the set of spectra present in the pushdown stack. In the calculation of $\bar{D}$ and VD the dark spectra measured during a measurement routine are supplemented by the P spectra present in the stack at the start of measurement routine. In the first dark measurement in a measurement routine, the earliest entered spectrum $D_1$ present in the stack is read into a first portion of DARKBUF. In subsequent dark measurements in the same measurement routine only the difference $D-D_1$ between the earliest entered spectrum D present in the stack and the spectrum $D_1$ stored in DARKBUF is used for each photodiode to calculate $\Sigma_1$ and $\Sigma_2$ and then the result of the measurement is entered into the stack. However, after performance of the final dark measurement in the measurement routine, the differences between the spectra present in the stack and $D_1$ are also added to $\Sigma_1$ and the squares of the differences are added to $\Sigma_2$. $\overline{D}$ and VD are then calculated from the values of $\Sigma_1$ and $\Sigma_2$.

The values of $\overline{S}$, $\overline{R}$, $\overline{D}$, VS, VR, and VD are used by a processing section 27 to calculate the average absorbance, $\overline{A}$, and its variance VA from the equations:

$$\overline{A} = -\log\left[(\overline{S}-\overline{D})/(\overline{R}-\overline{D})\right]$$

$$VA = [(\overline{R}-\overline{D})^2 VS + (\overline{S}-\overline{D})^2 \cdot VR + (\overline{R}-\overline{S})^2 VD]/(\overline{R}-\overline{D})^2(\overline{S}-\overline{D})^2$$

These results are stored in a memory 29 and, in response to user commands, can be transferred to CRT 113 for display to the user.

MEASUREMENT CONTROL SECTION

Figure 3A:
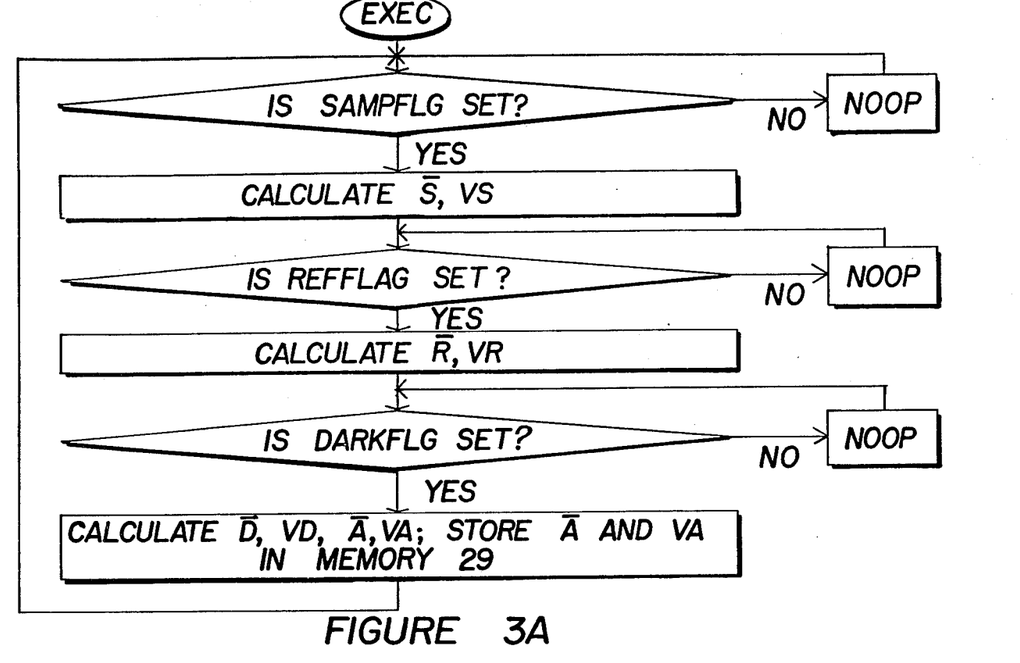
FIGS. 3A–3F present flow diagrams of the subroutines employed in the Measurement Control Section.

The analysis calculations of $\overline{S}$, $\overline{R}$, $\overline{D}$, VS, VR, and VD and the processing calculations of $\overline{A}$ and VA are performed by microprocessor 25 in accordance with a routine called Exec which is illustrated in FIG. 3A. Microprocessor 25 remains in a standby mode in which no analysis or processing is performed until it detects that SAMPFLG has been set, at which point it begins the analysis calculations of $\overline{S}$ and VS. After calculation of $\overline{S}$ and VS, microprocessor 25 again remains in a standby mode until it detects that REFFLAG has been set, at which point it begins the analysis calculations of $\overline{R}$ and VR. After calculation of $\overline{R}$ and VR, microprocessor 25 once again remains in standby mode until it detects that DARKFLG has been set, at which point it begins the analysis calculations of $\overline{D}$ and VD. When these calculations are completed, microprocessor 25 calculates $\overline{A}$ and VA, stores $\overline{A}$ and VA in memory 29, and returns to the beginning of the Exec routine.

The timing of measurement routines is controlled by a clock 210 which generates a sequence of periodic clock interrupts at 100 msec intervals. Each 100 msec interval will hereafter be referred to as a frame. Instrument control by Exec is interrupted at instrument turn-on when instrument control is determined by a subroutine selected by an initialization section 26. Initialization section 26 includes clock 210, a counter 216, and a beam selector 217. At turn-on, counter 216 is set equal to P, photodiode array 111 is disabled, and movement of the beam toward the dark position is initiated. The photodiode array is disabled initially so that the measurement in the first frame is skipped to avoid storing spurious results arising due to the movement of the beam. Array 111 is then enabled to enable the results of subsequent measurements to be stored.

The storage location of measured data is controlled by a pair of addresses called DATADDR and MADDR. DATADDR can assume one of three values which determine whether measured data is entered into buffer 22, 23, or 24. Likewise MADDR can assume one of 3 values to determine which portion of the selected buffer the data is to be entered. These three buffer portions correspond to the pushdown stack (which occurs only in buffer 24), FIRSTRS, and SUBSQRS. During the period of instrument control by initialization section 26, DATADDR is set equal to the address of buffer 24 and MADDR is set equal to the address of the pushdown stack (such a selection of addresses is indicated in the flow diagrams of FIGS. 3A-3F by the relations DATADDR=DARKBUF and MADDR=STACK). The movement of the beam at instrument turn-on is initiated by a signal from beam selector 217 to measurement section 10. At subsequent interrupts counter 216 is decremented by one and beam selector 217 signals measurement section 10 to execute a dark measurement. These dark measurements are repeated at P successive interrupts until counter 216 has a zero value and all P registers of the pushdown stack contain a dark spectrum.

When microprocessor 25 detects a zero value for counter 216, instrument control is transferred from initialization section 26 to the Exec routine in microprocessor 25. At each subsequent clock interrupt, execution of Exec is interrupted and microprocessor 25 checks the value of a variable called TCNT contained in a counter 211. If TCNT=0 then control is returned to Exec. If TCNT$\neq$0 then instrument control is determined by a subroutine selected by a measurement control section 28. The value of TCNT is controlled by section 28 which includes clock 210, counter 211, a pointer selector 212 to select the value of a pointer called TPTR, a ROM 213 containing a table called MEASTBL, a register 214 to hold a 16-bit variable called MSTATE, a ROM 215 containing a set of 16 subroutines, and beam selector 217.

The contents of ROM 215 is called MESCTRL and can be entered at any of the 16 points representing the beginning of a subroutine. The selection of the entry point is determined by the four most significant bits of MSTATE. At each clock interrupt, microprocessor 25 checks the value of TCNT. If TCNT=0, then control returns to Exec. If TCNT$\neq$0, then MESCTRL is entered at the entry point designated by MSTATE. Since only the first four bits of MSTATE control the choice of entry point, each 16-bit MSTATE word can be viewed as a 4 hexadecimal digit word with each hexadecimal digit defining an entry point. By successively shifting the MSTATE word 4 bit positions to the left, these hexadecimal digits can be successively shifted to the position in MSTATE which controls the choice of entry point.

In general the selection of MSTATE values is chosen to optimize the measurement process; every frame in the entire interval of a measurement routine is used either to move the beam or to make a sample, reference, or dark measurement; and sample, reference, and dark measurements are each made throughout the interval so that any time variation of collected data is uniformly reflected in all three types of data. The choice of the interval length for a frame is determined by a tradeoff between duty cycle and the time between sample and reference measurements. A shorter interval reduces the amount of instrument variation between successive measurements but increases the number of beam director moves thereby reducing duty cycle. The value of MSTATE is controlled by 3 subroutines for changing MSTATE and by the table called MEASTBL, such as the one shown in Table 1.

TABLE 1

MEASTBL

| TCNT | MSTATE (Hexadecimal) | Corresponding Subroutines |
|---|---|---|
| 10 (TMIN) | 9993 | ;(SKIP),SAMP,SAMP,SAMP,SKIP |
|  | AAA5 | ;REF,REF,REF,SKIP |
|  | B700 | ;DARK |
| 11 | 9993 | ;(SKIP),SAMP,SAMP,SAMP,SKIP |
|  | AAA5 | ;REF,REF,REF,SKIP |
|  | BB70 | ;DARK,DARK |
| 12 | 9999 | ;(SKIP),SAMP,SAMP,SAMP,SAMP |
|  | 3AAA | ;SKIP,REF,REF,REF |
|  | A5B7 | ;REF,SKIP,DARK |
| 13 | 9999 | ;(SKIP),SAMP,SAMP,SAMP,SAMP |
|  | 3AAA | ;SKIP,REF,REF,REF |
|  | A5BB | ;REF,SKIP,DARK,DARK |
|  | 7000 |  |
| 14 | 9999 | ;(SKIP),SAMP,SAMP,SAMP,SAMP |
|  | 3AAA | ;SKIP,REF,REF,REF |
|  | A5BB | ;REF,SKIP,DARK,DARK |
|  | B700 | ;DARK |
| 15 | 994A | ;(SKIP),SAMP,SAMP,SKIP,REF |
|  | A699 | ;REF,SKIP,SAMP,SAMP |
|  | 3AA5 | ;SKIP,REF,REF,SKIP |
|  | BB70 | ;DARK,DARK |
| 16 | 994A | ;(SKIP),SAMP,SAMP,SKIP,REF |
|  | A699 | ;REF,SKIP,SAMP,SAMP |
|  | 3AA5 | ;SKIP,REF,REF,SKIP |
|  | BBB7 | ;DARK,DARK,DARK |
| 17 | 994A | ;(SKIP),SAMP,SAMP,SKIP,REF |
|  | AA69 | ;REF,REF,SKIP,SAMP |
|  | 993A | ;SAMP,SAMP,SKIP,REF |
|  | A5BB | ;REF,SKIP,DARK,DARK |
|  | 7000 |  |
| 18 | 994A | ;(SKIP),SAMP,SKIP,REF |
|  | AA69 | ;REF,REF,SKIP,SAMP |
|  | 993A | ;SAMP,SAMP,SKIP,REF |
|  | A5BB | ;REF,SKIP,DARK,DARK |
|  | B700 | ;DARK |
| 19 | 9994 | ;(SKIP),SAMP,SAMP,SAMP,SKIP |
|  | AAA6 | ;REF,REF,REF,SKIP |
|  | 9993 | ;SAMP,SAMP,SAMP,SKIP |
|  | AAA5 | ;REF,REF,REF,SKIP |
|  | BB70 | ;DARK,DARK |
| 20 (TMAX) (BLOCK) | 9994 | ;(SKIP),SAMP,SAMP,SAMP,SKIP |
|  | AAA6 | ;REF,REF,REF,SKIP |
|  | B800 | ;DARK,RESET |

MEASTBL associates with each of a set of values of TCNT a corresponding set of MSTATE values. TABLE 1, in addition to displaying MEASTBL, indicates the set of subroutines corresponding to the listed values of MSTATE.

When a MEASURE command is entered from keyboard 114, the value of integration time $T_{int}$ (the duration of the measurement routine) is specified and determines the choice of measurement routine to be performed. Upon entry of a MEASURE command, TCNT is set equal to the number of frames contained in the interval $T_{int}$. If TCNT is less than TMAX then the subroutines corresponding to TCNT will be performed. If TCNT is equal to or greater than TMAX, then the subroutines corresponding to TMAX (this set of subroutines is referred to as BLOCK) will be performed and TCNT will be reduced by BLKCNT (which equals the number of frames required to execute BLOCK). This process of executing BLOCK and reducing TCNT by BLKCNT is repeated a number of times sufficient to reduce TCNT below TMAX, then the set of subroutines corresponding to TCNT is performed, TCNT is reduced to zero, and control is returned to Exec. In general, BLKCNT≦TMAX−TMIN so that the seriatim reduction of TCNT results in a value present in MEASTBL. In Table 1, the values of TMIN, TMAX, and BLKCNT were selected as 10, 20, and 10 respectively, but other choices can be used.

The selection of MSTATE values from MEASTBL is controlled by the pointer, TPTR. The values of TCNT and TPTR in turn are controlled by the 3 subroutines called Get Next Group (denoted GNG), Get Next State (denoted GNS) and Reset which are also used to change the value of MSTATE.

Figure 3B:
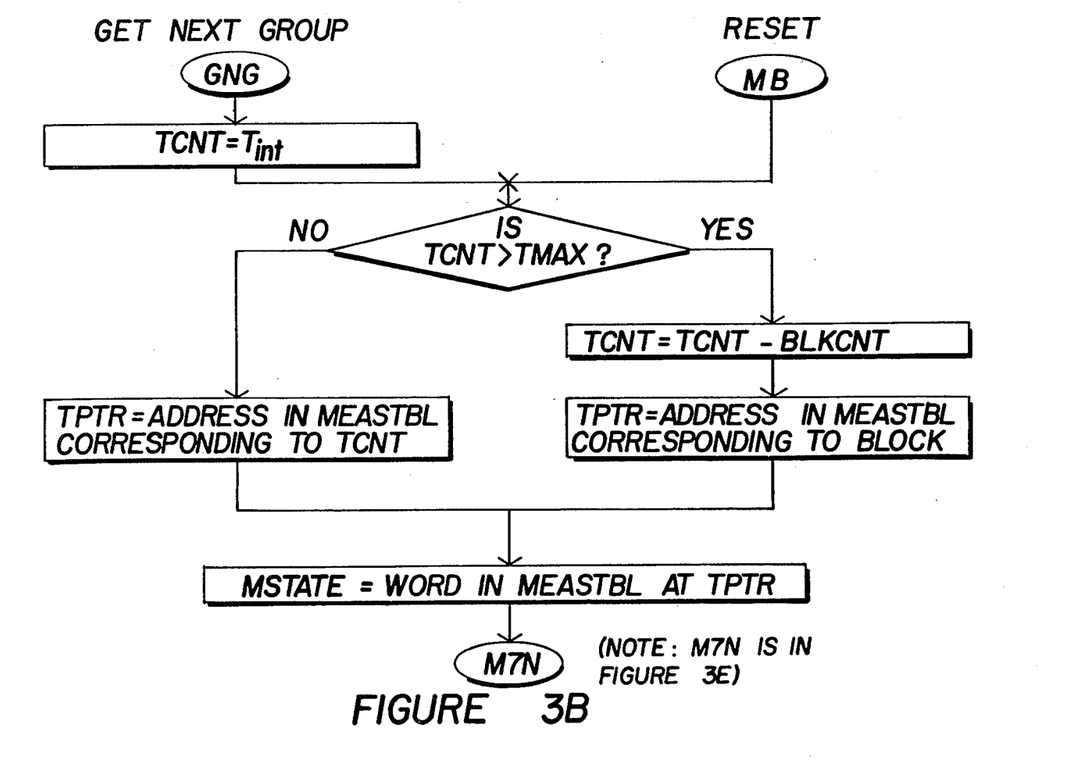
Figure 3C:
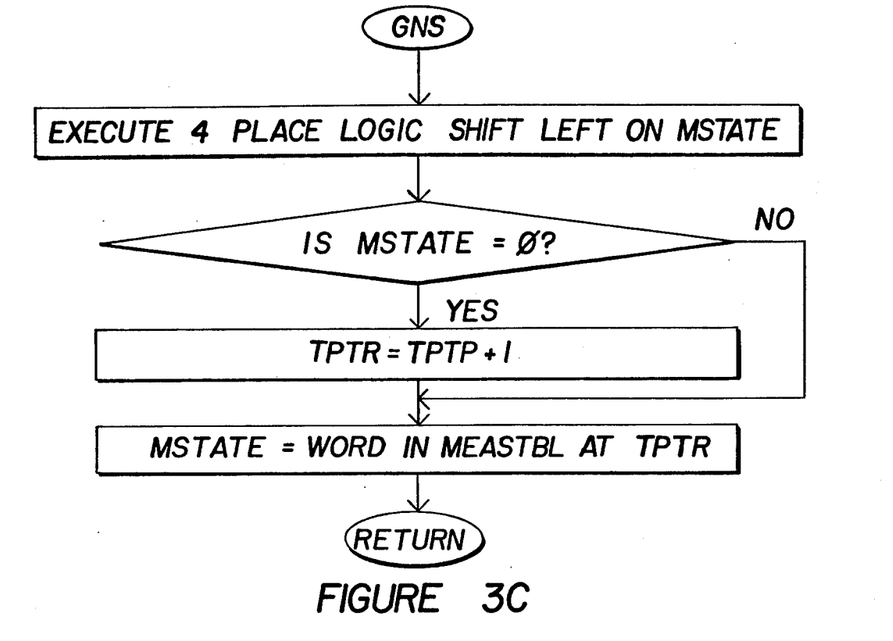
Figure 3D:
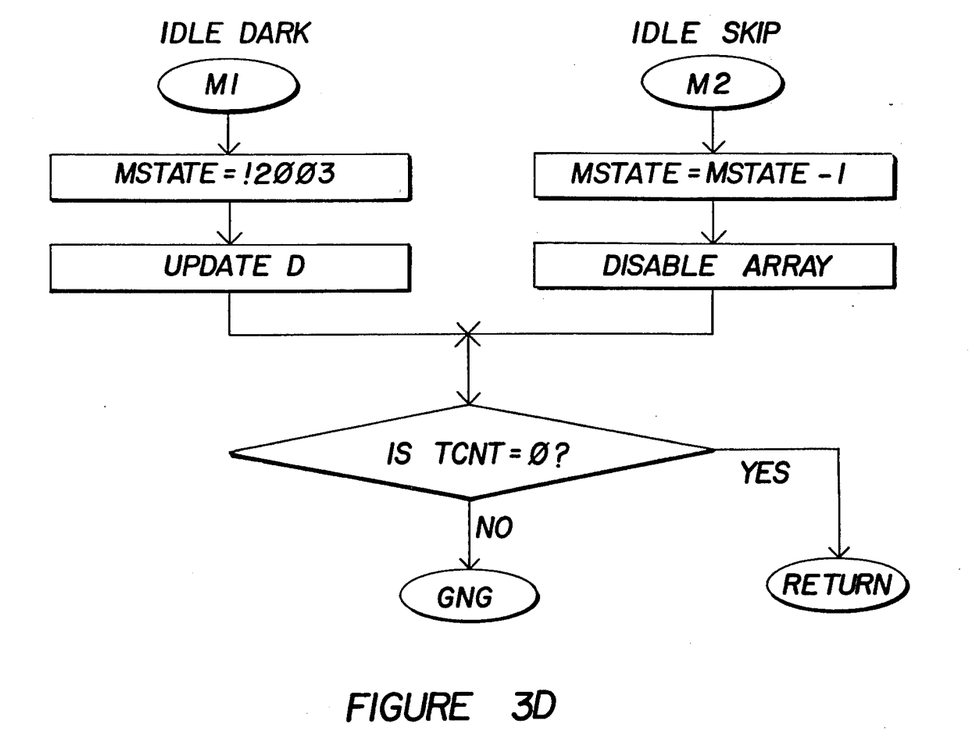
Figure 3E:
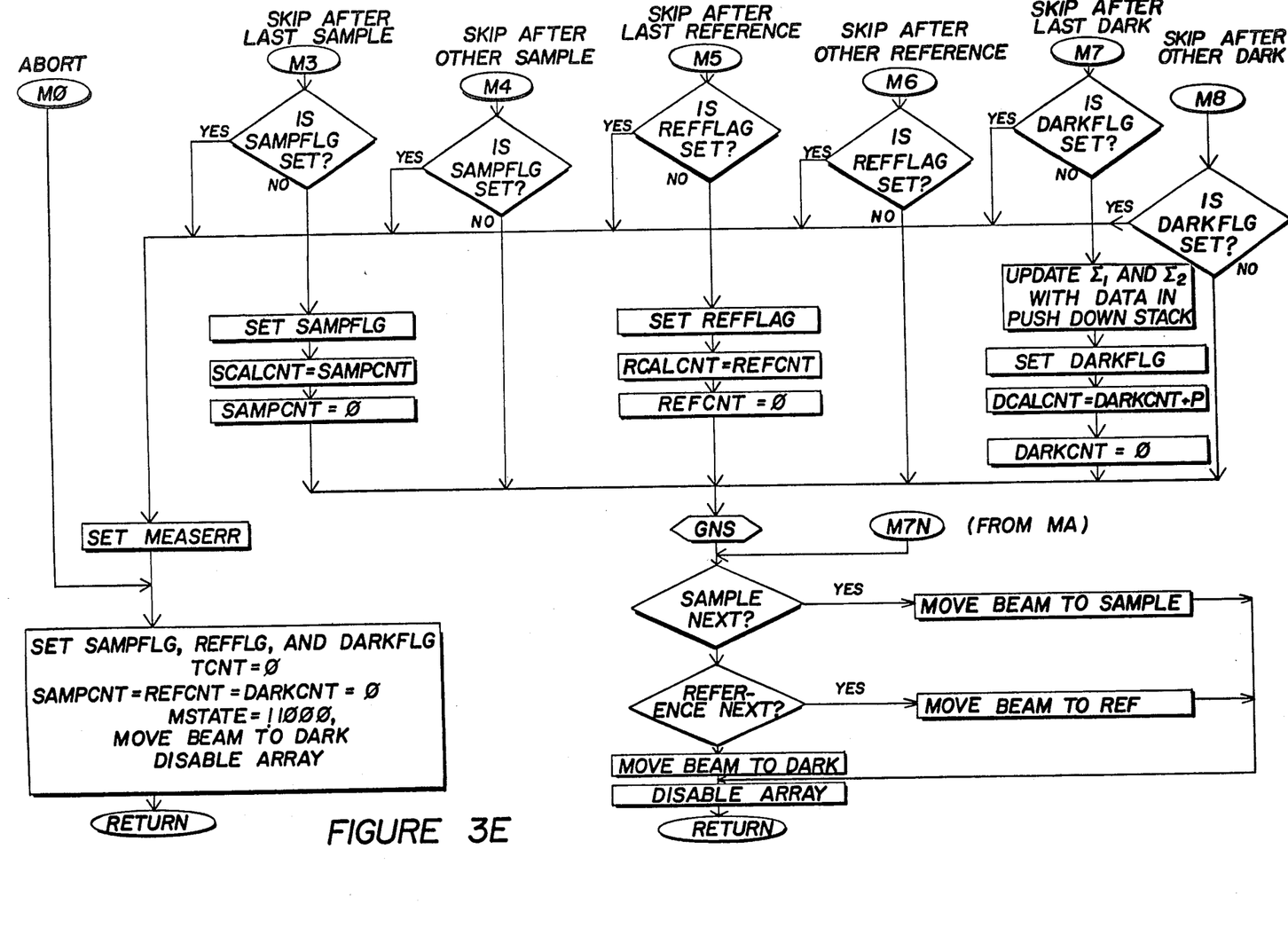
Figure 3F:
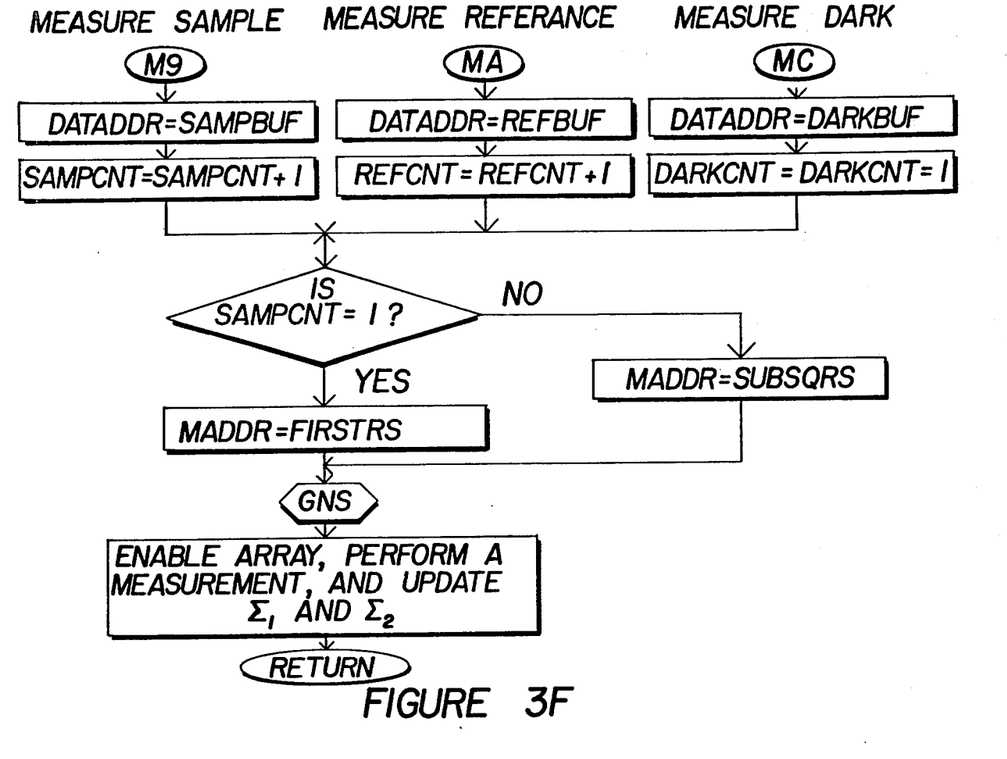

The selection of MSTATE words from MEASTBL is controlled by the subroutines GNG, GNS, and Reset as shown in FIGS. 3B and 3C. In GNG, TCNT is set equal to the number of frames contained in the interval $T_{int}$ and is then compared to TMAX. If TCNT is greater than TMAX then TCNT is reduced by the value of BLKCNT and TPTR is set equal to the address of the first word in BLOCK. If TCNT is not greater than TMAX then TPTR is set equal to the address of the first word in the group of words corresponding to the value of TCNT. In either case, MSTATE is set equal to the word in MEASTBL indicated by TPTR. GNG thus sets MSTATE equal to the first word corresponding to BLOCK or to the first word corresponding to TCNT depending on whether or not TCNT is greater than TMAX. The subroutine Reset differs from GNG only in omitting the initial step of setting TCNT equal to $T_{int}$. These two subroutines thus select the value of MSTATE from the words listed in MEASTBL.

In the subroutine GNS, MSTATE is shifted 4 places to the left to produce the new value of MSTATE. But if this new value of MSTATE is all zeros then TPTR is incremented one unit and MSTATE is set equal to the word indicated by TPTR. GNS thus shifts successive hexadecimal digits in a group of words in MEASTBL into the position in MSTATE which controls the choice of entry points and then, when MSTATE becomes zero by this process, GNS selects the next MSTATE word from MEASTBL.

The choice of entry point determines such things as: whether a measurement is made; whether a measurement is a sample, reference, or dark measurement; whether the next frame is skipped; and whether a calculation of the average and variance of a set of measurements is to be performed. Flow diagrams for the steps which occur at the 16 entry points are shown in FIGS. 3B thru 3F. These entry points correspond to the following 16 subroutines:

M0: Abort:

No measurement is made and control is returned directly to Exec. An abort can occur either because of an error or because of a STOP command. To signal the termination of that Measure operation, SAMPFLG, REFFLAG, and DARKFLG are set; SAMPCNT, REFCNT, and DARKCNT (counters which respectively count the number of sample, reference, and dark measurements which have been made in the measurement routine) are set to zero; and MSTATE is set equal to !1000 so that the apparatus in the next frame will execute the Idle Dark Subroutine appropriate for the period between measurements. In addition, the beam is moved to the dark position, the array is disabled, and control is returned to Exec.

M1: Idle Dark and M2: Idle Skip:

These 2 entry points are used in conjunction during the time interval between measurement routines to update the contents of the pushdown stack in DARKBUF. In order to reduce the amount of time required by the CPU to perform these updates, only every fifth frame is actually measured. To achieve this: a dark measurement is performed during the Idle Dark steps; DATADDR is set equal to DARKBUF and MADDR is set equal to Push-down stack to enter the measurement results into the pushdown stack replacing the earliest entered spectrum present in the stack; and MSTATE is set equal to 2003 so that the next entry point will be M2. In the Idle Skip steps, no measurement is made and MSTATE is decremented one unit. After 4 cycles through the Idle Skip steps, the value of MSTATE will be !1999 so that the next entry point will be M1. Both Idle Dark and Idle Skip check TCNT to see if a MEASURE command has been entered. If TCNT=0, then control is returned to Exec and this process of updating D is continued. If TCNT≠0, then GNG is used to select the next value of MSTATE, the beam is moved to the position designated by MSTATE, the array is disabled so that no data will be read will the beam is being moved, and control is returned to Exec.

M3: Skip After Last Sample:

This entry point is used to move the beam after the last sample measurement in a measurement routine and to initiate calculation of the average and variance of the sample spectrum. SAMPFLG is checked to see if it is still set and if it is then SAMPBUF contains data from 2 measurement routines. The flag called MEASERR is therefore set to indicate the presence of a measurement error.

If SAMPFLG is not still set then the prior data calculations have been completed and therefore storage of new data will not overlap with data stored in the prior measurement routine. SAMPFLG is set to indicate that the calculations of average and variance of the sample data can proceed. A counter in microprocessor 25 called SCALCNT is set equal to SAMPCNT to represent the number M of sample measurements made in the measurement routine and then SAMPCNT is set equal to zero. This number M is the number used in the calculation of S and VS from the data stored in SAMPBUF. MSTATE is updated by the subroutine GNS, the beam is moved to the position for the next measurement, the array is disabled, and control is returned to Exec.

M4: Measure Skip After Other Sample:

This entry point is used to move the beam after a sample measurement other than the last sample measurement in the measurement routine. The steps are the same as in entry point M3 except the steps which change the values of SCALCNT, SAMPCNT, and SAMPFLG are omitted.

M5: Skip After Last Reference and M6: Skip After Other Reference:

The steps analogous to those performed in M3 and M4 respectively are performed in M5 and M6 respectively except REFFLAG is used in place of SAMPFLG, RCALCNT (a counter which contains the number of reference measurements for use in calculating $\overline{R}$ and VR) is used in place of SCALCNT, and REFCNT is used in place of SCALCNT.

M7: Skip After Last Dark and M8: Skip After Other Dark:

The steps analogous to those performed in M3 and M4 respectively are performed in M7 and M8 respectively except DARKFLG is used in place of SAMPFLG, DCALCNT (a counter which contains the number of dark measurements for use in calculating $\overline{D}$ and VS) is used in place of SCALCNT, and DARKCNT is used in place of SCALCNT. These steps are, however, also modified to include the update of $\Sigma_1$ and $\Sigma_2$ by the data present in the pushdown stack. In such update the difference $S-S_1$ and the square of the difference $(S-S_1)^2$ are added to $\Sigma_1$ and $\Sigma_2$ respectively for each spectrum S present in the pushdown stack.

M9: Measure Sample:

This entry point is used to measure a sample spectrum and store the data in SAMPBUF. DATADDR is set equal to SAMPBUF to select SAMPBUF as the storage buffer. SAMPCNT is incremented by 1 to indicate the execution of an additional sample measurement. If SAMPCNT equals 1 then the first sample measurement in the measurement routine is to be performed and so MADDR is set equal to FIRSTRS to store the data $S_1$ in the portion of SAMPBUF called FIRSTRS. If SAMPCNT is not equal to 1 then MADDR is set equal to SUBSQRS to store the data S in the portion of SAMPBUF called SUBSQRS. The next value of MSTATE is selected by GNS, the photodiode array is enabled and Beam selector 217 signals measurement section 10 to perform a measurement. Microprocessor 25 adds the difference $S-S_1$ and the square of the difference $(S-S_1)^2$ respectively to the sum of the differences, $\Sigma_1$, and the sum of the squares, $\Sigma_2$, of the prior measurements in that measurement routine. Control is then returned to Exec.

MA: Measure Reference and MC: Measure Dark:

The steps analogous to those performed in M9 are performed in MA and MC except: (1) DATADDR is set equal to REFBUF in MA and equal to DARKBUF in MC; (2) instead of incrementing SAMPCNT, REFCNT is incremented by 1 in MA and DARKCNT is incremented by 1 in MC; (3) in MC the data is read into the pushdown stack replacing the earliest entered data in the stack—the earliest entered data in turn is entered into the portion of DARKBUF indicated by MADDR; and (4) DCALCNT is set equal to DARKCNT plus P in order to reflect the extra P dark spectra included in the calculation of $\overline{D}$ and VD.

MB: Reset:

These steps were previously described when GNS and GNG were discussed.

MD, ME, MF:

These entry points can be used to perform internal diagnostic tests and are not needed for generation of measurement routines.

Figure 4:
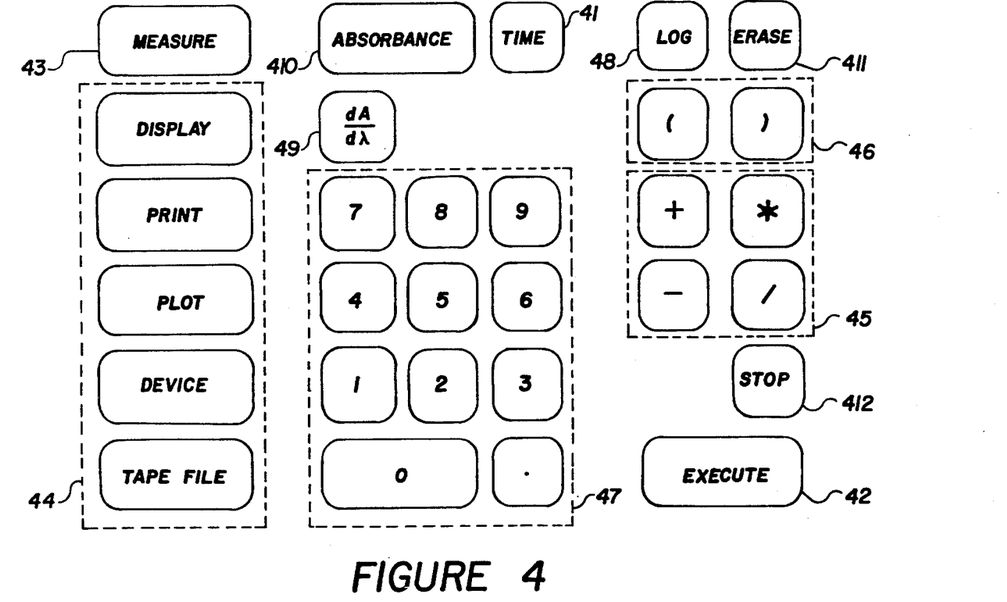
FIG. 4 shows a keyboard suitable for input to the central processing unit.

FIG. 4 shows a keyboard suitable for input control of the spectrophotometer. A TIME key 41 and an execute key 42 are included to enable entry of an integration time $T_{int}$ by a command of the form: MEASURE TIME $T_{int}$ EXECUTE. Once the integration time has been entered, a measurement can be initiated by use of MEASURE key 43 in a command of the form: MEASURE EXECUTE.

The destination keys in section 44 are used to output data from memory 29. The DISPLAY key selects the CRT as the data destination. The other keys are used to send the data to external destinations such as a printer, a plotter, a device such as a calculator, or a tape file for storage. A general destination command has the form: DESTINATION EXECUTE (where Destination is one of the keys DISPLAY, PRINT, PLOT, DEVICE, or TAPE FILE).

The keys in section 45 initiate the arithmetic operations of addition, subtraction, multiplication, and division. These keys together with parenthesis keys 46, numeric keys 47, base 10 logarithm key 48, derivative key 49, and ABSORBANCE key 410 enable the manipulation of data before output. To perform such manipulation the keys are pressed to generate a functional expression in which ABSORBANCE is the independent variable. An example of such a command is as follows:

$$\frac{d}{d\lambda}(35*\text{LOG ABSORBANCE} + 6*\text{ABSORBANCE})\text{EXECUTE}$$

The numbers employed in such commands can include explicit errors by keying in the numbers in the form $N+-\Delta N$ to denote a number $N$ with variance $(\Delta N)^2$. With this additional capability, a full statistical propagation of error analysis is automatically initiated including measurement errors, numerical truncation errors and, if include in data input from the keyboard, uncertainties of the concentrations of standard solutions.

In an alternative embodiment of the apparatus, the pushdown stack of registers can be omitted by using a simpler technique for updating the dark spectrum, D. In this alternate embodiment, the dark spectrum D is measured and an updated average dark spectrum $\overline{D}'$ is calculated as a weighted average of D and the prior average dark spectrum $\overline{D}$ by the relation $\overline{D}' = \overline{D} + (D - \overline{D})/16$. After N dark spectra $D_1, \ldots, D_N$ have been measured the average dark spectrum is equal to:

$$(1/16) \sum_{k=1}^{N} (15/16)^{N-k} D_k + (15/16)^N D_1.$$

The average dark spectrum is thus equal to a weighted average, with the more recent dark spectra being more heavily weighted. The coefficient of (1/16) on D in this average in effect weights the most recent measurement as if it were averaged with 15 other measurements and thus smooths out short term fluctuations. However, VD should be more sensitive to short term fluctuations for example to signal the existence of a step change in the value of D. A coefficient of (1/4) is therefore employed to calculate the new variance $VD' = 3VD/4 + (D - \overline{D}')^2/4$.

The weighting factors of 1/16 and 1/4 are employed because they are easily implemented by the simple operations of addition and logic shift right by 4 and 2 places respectively. A weighting factor of $2^{-n}$ is likewise easy to implement for integral values of n by the operations of addition and logic shift right by n places. The choice of n is determined by the ratio between the instrument variation time $t_I$ and the duration of a frame in order to substantially count only the dark measurements which have been performed within a time on the order of $t_I$ prior to the most recent dark measurement.

In this embodiment, buffer 24 is modified to consist of 2 registers $\alpha$ and $\beta$ for holding $\overline{D}$ and 4VD, respectively and initialization section 216 is modified to eliminate counter 216. At instrument turn-on, MADDR is set equal to the address of DARKBUF and the dark spectrum D is measured. DATADDR is set equal to the address of register $\alpha$ to store D in that register. DATADDR is then set equal to the address of register $\beta$ to enter the largest number that register $\beta$ can hold so that VD will initially be large to indicate an initial large uncertainty in D. When this is completed, microprocessor 25 is signalled to initiate the Exec routine.

In subsequent dark measurements, D is stored in a temporary register $\gamma$ and $\overline{D}'$ is calculated and stored in register $\alpha$. 4VD' is then calculated from the values of $\overline{D}$, 4VD and D contained respectively in registers $\alpha$, $\beta$ and $\gamma$ and the result is stored in register $\beta$. Registers $\alpha$ and $\beta$ thus contain the updated values of $\overline{D}$ and 4VD respectively. The contents of MEASTBL are modified from that disclosed in the previously described embodiment to implement this alternative mode for updating $\overline{D}$ and VD. In particular, subroutines M1, M7 and MC are modified to implement these altered subroutines. The reason that 4VD is stored in register $\beta$ instead of VD is that the factor of four produces an expansion of the variance spectrum for display purposes and also simplifies the alogrithm for calculating the variance. This algorithm is: $(4VD') = (4VD) - (4VD)/4 + (D - \overline{D}')^2$.

We claim:

1. A method of eliminating instrument response variation in the operation of a measuring apparatus having a measurement section for performing reference, sample and dark measurements and having an internal calculating section to produce from the sample, reference and dark measurements an average normalized dark-corrected value, said method comprising the steps of:
   (a) aperiodically interspersing throughout a measurement interval the performance of all three types (i.e., sample, reference and dark) of measurements, each measurement producing a result having a multiplicative factor that can vary during the measurement interval because of instrument response variations;
   (b) producing from the sample measurements an average sample value $\overline{S}$, from the reference measurements an average reference value $\overline{R}$ and from the dark measurements an average dark value $\overline{D}$; and
   (c) generating, from these three average values, an average normalized dark-corrected value equal to $(\overline{S} - \overline{D})/(\overline{R} - \overline{D})$, whereby, because each type of measurement is performed throughout the measurement interval, the average value for each type of measurement has an average multiplicative error that reflects instrument response variation throughout the measurement interval so that these average multiplicative factors are substantially equal and cancel out in the generated average normalized dark-corrected value.

2. A method as in claim 1 further comprising the steps of:
   (d) producing for each of the three types of measurements an error value representing the statistical variation of that type of measurement; and
   (e) generating, from the average values and the error values of the three types of measurements, an error value for the average normalized dark-corrected value, this last mentioned error value representing the statistical variation of the average normalized dark-corrected value.

3. A method as in claim 1 wherein the interval between the initiation of successive measurements is small compared to the interval over which instrument response variation is significant.

4. A method of reducing the amount of memory required to produce average and error values in a measuring apparatus having a measurement section for performing measurements and having an internal calculating section to produce from the measurements an average value and an error value, said method comprising the steps of:
   (a) performing a plurality of measurements to produce measured data;

(b) as step (a) is being performed, generating from the measured data a pair of numbers E1 and E2 which are functionally independent functions of N1 and N2 where N1 is the average of the measured data and N2 is the average of the squares of the measured data, E1 and E2 being functionally independent functions of N1 and N2 so that the functions E1 and E2 can be inverted to yield N1 and N2; E1 and E2 being updated by measured data at a rate as fast as the measured data is generated, whereby the amount of memory required to produce E1 and E2 is independent of the number of measurements performed, thereby reducing the burden on memory that would otherwise result if all of the data had to be stored before calculation of average and error values for data.

5. A method as in claim 4 wherein the measurements in step (a) are sample measurements and further comprising the execution of steps (a)–(c) for both a plurality of reference measurements and a plurality of dark measurements to produce average and error values for the sample measurements, average and error values for the reference measurements and average and error values for the dark measurements, each of said error values representing the statistical variation of the measurements on which that error value is determined.

6. A method as in claim 5 further comprising the step of generating from the average and error values for the sample, reference and dark measurements an average normalized dark-corrected value and an error value for the average normalized dark-corrected value representing the statistical uncertainty of the average normalized dark-corrected value.

7. A method as in claim 4 wherein E1=N1 and E2=N2.

8. A method as in claim 4 wherein step (b) comprises the steps of:
(d) for the first measurement in a set of P data measurements, storing the value S1 of this first measurement;
(e) generating E1 as the sum from k=2 to P of (Sk−S1) where Sk is the value of the measured data in the kth measurement in the set of P measurements;
(f) generating E2 as the sum from k=2 to P of the square of (Sk−S1), whereby E1 and E2 are typically much smaller than N1 and N2 thereby reducing the number of bits of memory required to store without overflow or truncation of the data required to calculate the average and error values; and
wherein in (c) the average value and the error value are generated from E1, E2 and S1.

9. A method as in claim 4 wherein the measuring apparatus is a spectrophotometer, wherein each measurement produces measured data at a plurality of wavelengths and at each wavelength steps (a)–(c) are performed for the plurality of measurements to produce average and error values at each wavelength.

10. A method as in claim 6 wherein the measuring apparatus is a spectrophotometer, wherein each measurement produces transmission data at a plurality of wavelengths thereby producing a transmission spectrum over the range of measured wavelengths and wherein at each measured wavelength steps (a)–(c) are performed for the plurality of measurements to produce an average normalized dark-corrected transmission spectrum value and an error spectrum.

11. A method as in claim 4 wherein E1 is proportional to the sum of the measured data and E2 is proportional to the sum of the squares of the measured data.

12. A method of reducing the amount of memory required to produce average and error values in a measuring apparatus having a measurement section for performing measurements and having an internal calculating section to produce from the measurements an average value and an error value, said method comprising the steps of:
(a) performing a plurality of sets of measurements, each set including a sample measurement producing a sample measured data S, a reference measurement producing a reference measured data R and a dark measurement producing a dark measured data D;
(b) as step (a) is being performed, generating from each set of measured data a normalized dark-corrected value V equal to (S−D)/(R−D);
(c) as step (a) is being performed, generating from the values V a pair of numbers E1 and E2 which are functionally independent functions of N1 and N2 where N1 is the sum of the values V for the sets of measurements and N2 is the sum of the squares of the values V, E1 and E2 being functionally independent functions of N1 and N2 so that these functions can be inverted to yield N1 and N2; E1 and E2 being updated by measured data at a rate as fast as the measured data is generated, whereby the amount of memory required to produce E1 and E2 is independent of the number of measurements performed; and
(d) after the performance of the last measurement, generating from E1 and E2, an average value for the measurement data and an error value representing the statistical uncertainty of the average value, thereby reducing the burden on memory that would otherwise result if all of the data had to be stored before calculation of average and error values for data.

13. A method as in claim 12 wherein E1=N1 and E2=N2.

14. A method as in claim 12 wherein step (c) comprises the steps of:
(d) for the first set of measurements in a group of P sets of data measurements, storing the value V1 produced from this first set of measurements;
(e) generating E1 as the sum from k=2 to P of (Vk−V1) where Vk is the value of the measured data in the kth measurement in the set of P measurements;
(f) generating E2 as the sum from k=2 to P of the square of (Vk−V1), whereby E1 and E2 are typically much smaller than N1 and N2 thereby reducing the number of bits of memory required to store without overflow or truncation of the data required to calculate the average and error values; and
wherein in (c) the average value and the error value are generated from E1, E2 and V1.

15. A method as in claim 12 wherein E1 is proportional to the sum of the measured data and E2 is proportional to the sum of the squares of the measured data.

* * * * *